Figure 1:
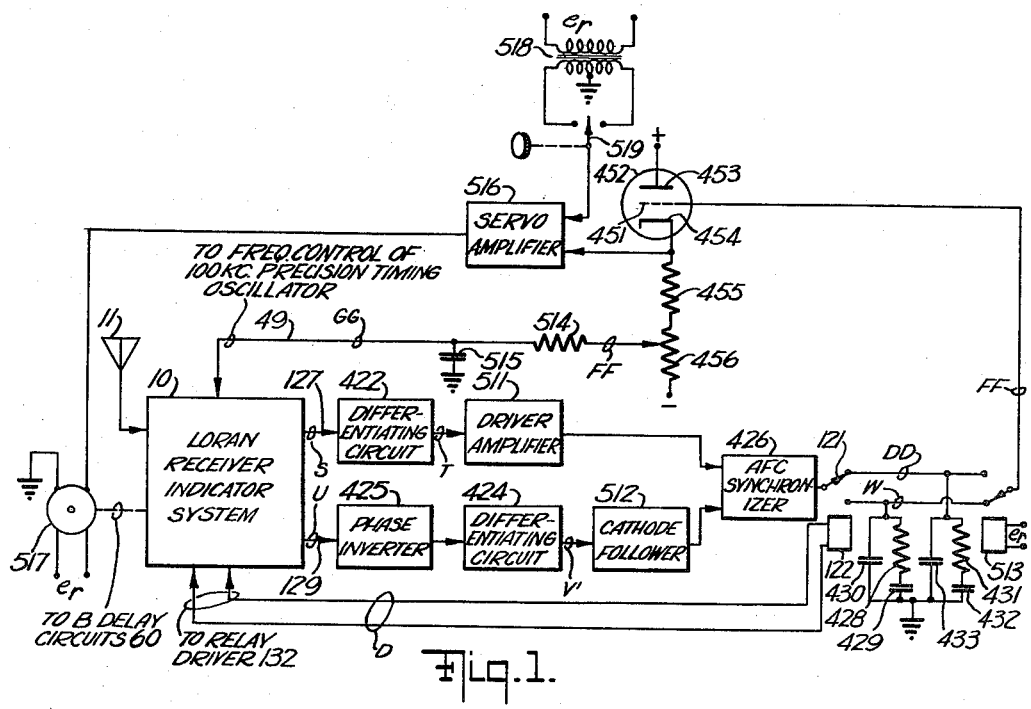

Oct. 23, 1956

E. DURBIN 2,768,373

AUTOMATIC FREQUENCY CONTROL SYSTEM FOR
HYPERBOLIC NAVIGATION RECEIVERS

Filed Sept. 1, 1954

INVENTOR
EDWARD DURBIN
BY
*R. F. Spencer*
AGENT

United States Patent Office 2,768,373
Patented Oct. 23, 1956

2,768,373

AUTOMATIC FREQUENCY CONTROL SYSTEM FOR HYPERBOLIC NAVIGATION RECEIVERS

Edward Durbin, Valley Stream, N. Y., assignor to Sperry Rand Corporation, a corporation of Delaware Application September 1, 1954, Serial No. 453,711

7 Claims. (Cl. 343—103)

The present invention relates to automatic frequency control systems, and in particular to a simplified automatic frequency control system useful in loran receiver-indicators.

In Patent 2,636,988, assigned to the same assignee as the present invention, there is shown and described an AFC system for a loran receiver-indicator wherein a highly stable reference oscillator is automatically maintained in synchronism with received master pulses. The AFC system includes a cascade of frequency dividers coupled to the output of the reference oscillator for producing first recurrent pulses which are brought into coincidence with a differentiated version of the received master pulse voltage. These recurent first pulses are maintained in synchronism with the received master pulse voltage by automatically controlling the frequency of the reference oscillator in response to a control voltage varying according to the relative time difference between the recurrent first pulses and the differentiated version of the received master pulse voltage. A similar AFC system is employed in the loran receiver-indicator of Patent 2,651,033.

The loran receiver-indicator of Patent 2,651,033 further includes adjustable time delay circuits coupled to the frequency dividers for producing second recurrent pulses whose time position relative to the first recurrent pulses is adjustable in order to bring the second recurrent pulses into coincidence with a differentiated version of the received slave pulse voltage. The delayed recurrent second pulses may be maintained in synchronism with the received slave pulse voltage, as the loran receiver-indicator is moved in space relative to the loran transmitters, either by manual adjustment of the time delay circuits or by the automatic tracking system shown and described in application S. N. 267,347, filed January 21, 1952 in the name of Roger B. Williams, Jr., now Patent No. 2,697,219 issued December 14, 1954, entitled "Automatic Time Delay Measuring Circuits" and assigned to the same assignee as the present invention. The time difference between the arrival of master and slave pulses is the time difference interval between the recurrent first pulses and the delayed recurrent second pulses. This time delay difference is indicated by a time delay counter coupled to the adjustable time delay circuits.

In application S. N. 418,680, filed March 25, 1954, in the name of Robert L. Frank, entitled "Automatic Frequency Control System" and assigned to the same assignee as the present invention, there is disclosed an improved AFC system for a loran receiver-indicator in which the precision reference oscillator may be synchronized with either the received master pulses or the received slave pulses. This improved AFC system is based upon the fact that the transmitter of the slave station must of necessity be accurately synchronized to the master transmitter. The improved AFC system also includes the provision for synchronizing the precision reference oscillator automatically with the stronger of the received master or slaved pulse signals, thereby improving the synchronization of the precision reference oscillator upon the momentary loss due to fading of either of the master or slave pulse signals, or to improper transmitter operation of either master or slave station.

The present invention is related to these prior AFC systems and discloses a simplified AFC system especially useful in an automatic tracking loran receiver-indicator, and which synchronizes the precision reference oscillator with either the received master or slaved pulses, in a generally similar manner as taught in the aforesaid application S. N. 418,680.

Accordingly, a principal object of the present invention is to provide a simplified automatic frequency control system for the precision reference oscillator of a loran receiver-indicator.

Another object is to automatically control the frequency of the precision reference oscillator of a loran receiver-indicator with a frequency control voltage derived from both the received master and slave pulse signals.

Still another object of the invention is to simultaneously control the frequency of the precision reference oscillator and the time delay of the delayed recurrent pulses of an automatic tracking loran receiver-indicator until the precision reference oscillator and the automatic tracking circuits are properly synchronized to the received master and slave pulse signals.

In accordance with the present invention there is introduced an automatic frequency control system for controlling the frequency of the precision reference oscillator of an automatic tracking loran receiver-indicator according to the average value of a control voltage which alternates between a first direct potential value and a second direct potential value. The first direct potential varies in magnitude and polarity according to the coincidence or relative time difference between the first output pulses from the precision reference oscillator and a differentiated version of the received master pulses, and the second direct potential varies in magnitude and polarity according to the relative time difference between the delayed second output pulses from the adjustable time delay circuits and a differentiated version of the received slave pulses. The average value of the control voltage is supplied to a frequency control circuit for automatically maintaining the frequency of the precision reference oscillator synchronized with the received master and slave pulses. The average value of the control voltage alters the frequency of the precision reference oscillator until the control voltage is reduced substantially to zero. The control voltage is also supplied to the automatic time delay circuits of the tracking loran receiver-indicator to automatically maintain the delayed second output pulses from the adjustable time delay circuits synchronized to a position on the received slave pulses identical to the position on the received master pulses to which the first output pulses from the precision reference oscillator are synchronized, in a generally similar manner as taught in the aforesaid application S. N. 267,347.

Figure 2:
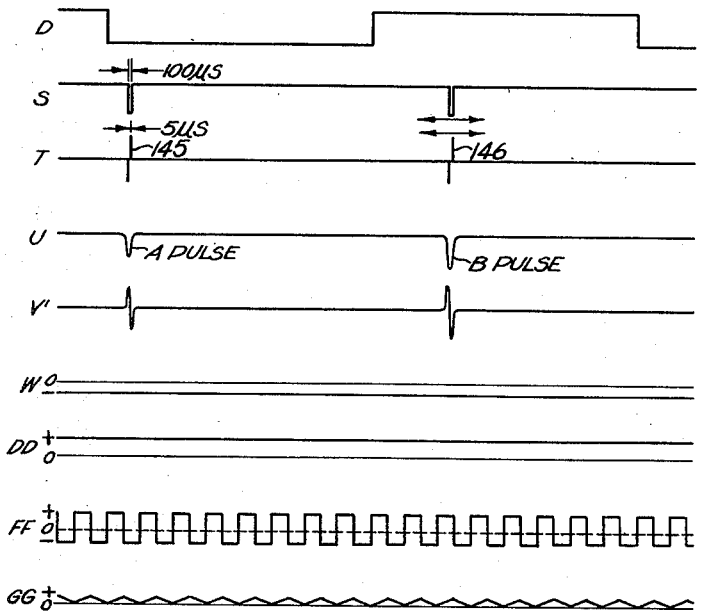

The above objects of and the brief introduction to the present invention will be more fully understood and further objects and advantages will become apparent from a study of the following detailed description in connection with the drawing, wherein, Fig. 1 is a combination block and schematic diagram of a loran receiver-indicator system employing the simplified automatic frequency control system of the present invention; and Fig. 2 illustrates the waveforms of voltages associated with the simplified automatic frequency control system.

Those elements in the accompanying drawing fully corresponding to those in the aforesaid Patent 2,651,033 and applications S. N. 267,347 and S. N. 418,680 are identified by the same reference numerals as employed therein.

Referring to Fig. 1, the loran receiver-indicator system 10 is supplied with loran A and B pulses of carrier-wave energy collected by antenna 11. This receiver-indicator system 10 is identical to the loran receiving system of the aforesaid Patent 2,651,033 except for the AFC system of the present invention. The loran receiving system 10 is adjusted by an operator to obtain useful navigational information in the manner described in the patent.

The AFC system of the present invention receives first and second recurrent negative pulses of 100 microseconds' duration from an AFC delay circuit contained within the loran receiving system 10, and supplies these first and second recurrent pulses over lead 127 to the input of a differentiating circuit 422. These first and second recurrent pulses, illustrated by the waveform S in the prior patent as well as in Fig. 2 of the present drawing, are derived from the precision oscillator-divider circuits, the A-delay circuits, and the B-delay circuits as fully described in the aforesaid Patent 2,651,033. The differentiating circuit 422 produces first and second positive trigger or sampling pulses 145 and 146 of waveform T, respectively, from the trailing edges of the first and second negative pulses of waveform S. These positive sampling pulses are approximately five microseconds in duration. Driver amplifier 511 couples these positive sampling pulses to one input of an AFC synchronizer 426, and the driver amplifier isolates the AFC synchronizer from the differentiating circuit.

The loran receiver-indicator system 10 supplies negative loran A and B pulses from an AFC amplifier to a phase inverter 425 over the lead 129. These negative loran pulses are illustrated as waveform U in the aforesaid Patent 2,651,033 as well as in Fig. 2 of the drawing. Positive loran pulses from phase inverter 425 are supplied to a differentiating circuit 424 which produces differentiated bi-directional output pulses of waveform V', as is more fully described in the aforesaid Patents 2,636,988 and 2,651,033. These differentiated bi-directional pulses are coupled through cathode follower 512 to another input of the AFC synchronizer 426.

When the received loran A and B pulses have been properly matched on the face of the cathode-ray tube on the loran receiver-indicator 10 by an operator, the AFC synchronizer 426 produces first output pulses of current whose magnitude and polarity vary according to the relative time position or coincidence between the first positive sampling pulses 145 of waveform T and the differentiated loran A pulses of waveform V'. The AFC synchronizer 426 produces second output pulses of current whose magnitude and polarity vary according to the relative time position or coincidence between the second positive sampling pulses 146 of waveform T and the differentiated loran B pulses of waveform V'.

The output of AFC synchronizer 426 is coupled to the armature or movable contact 121 of relay 122 which alternates between the lower switch position during reception of the A pulses and the upper switch position during reception of the B pulses. The relay is energized by the square-wave voltage of waveform D, Fig. 2, obtained from the relay driver of the loran receiver-indicator system 10. The first output pulses of current from AFC synchronizer 426, which may vary in both magnitude and polarity, are coupled through the movable contact 121 to a first integrating circuit comprising resistor 428 and condensers 429 and 430. The second output pulses of current from AFC synchronizer 426 are coupled through the movable contact 121 to a second integrating circuit comprising resistor 431 and condensers 432 and 433.

The first integrating circuit produces a first direct output voltage, illustrated as waveform W of Fig. 2, whose magnitude and polarity vary according to the relative time position between the positive sampling pulses 145 and the differentiated A pulses. The second integrating circuit produces a second direct output voltage of waveform DD whose magnitude and polarity vary according to the relative time difference between the positive sampling pulses 146 and the differentiated B pulses. These first and second direct voltages are supplied alternately to the control-grid 451 of cathode follower tube 452 through a vibrating relay 513 which is energized by a 400 cycle-per-second reference voltage $e_r$. The voltage at control-grid 451 alternates between the first and second direct voltages at the frequency of 400 cycles-per-second, as illustrated by waveform FF of Fig. 2. The anode 453 of cathode follower 452 is coupled to a source of positive potential, and cathode 454 is coupled through cathode resistor 455 and potentiometer 456 to a source of negative potential.

The 400 cycle-per-second error control voltage of waveform FF from the output of the cathode follower at the arm of potentiometer 456 is coupled to a low pass filter circuit consisting of series resistor 514 and shunt condenser 515. The filter circuit substantially removes the alternating component of the 400 cycle error control voltage and provides an output frequency control voltage varying according to the average value of the error control voltage of waveform FF. This frequency control voltage across condenser 515, illustrated as waveform GG of Fig. 2, is applied over lead 49 to the frequency control circuit of the precision timing oscillator of the loran receiver-indicator system 10.

The 400 cycle-per-second error control voltage at cathode 454 of the cathode follower is amplified by servo amplifier 516 and supplied to a two-phase 400 cycle-per-second servomotor 517. The reference voltage $e_r$ is also supplied to the servomotor. The servomotor is mechanically coupled to the variable B-delay circuits of the loran receiving system 10 for varying the time position of the variably-delayed positive sampling pulses 146 of waveform T. The servomotor varies the time position of the positive sampling pulses 146 until the magnitude of the square-wave error control voltage of waveform FF is reduced to zero. The magnitude of this error control voltage is determined by the difference between the first and second direct voltages of waveform W and DD. The difference between these first and second direct voltages is determined by the difference between the magnitude of the differentiated A pulses at the time of occurrence of the first positive sampling pulses 145 and the magnitude of the differentiated B pulses at the time of occurrence of the second positive sampling pulses 146. The phase of the error control voltage of waveform FF is determined by whether the magnitude of the differentiated A pulse at the time of occurrence of the first positive sampling pulses 145 is greater or less than the magnitude of the differentiated B pulses at the time of occurrence of the second positive sampling pulses 146. Accordingly, the servomotor 517 alters the time position of the variably-delayed positive sampling pulses 146 relative to the differentiated B pulses until the second direct voltage of waveform DD exactly equals the first direct voltage of waveform W, in the same general manner as described in the aforesaid application S. N. 267,347.

A slewing voltage for energizing the servomotor 517 to advance or delay the time position of the positive sampling pulses 146 relative to the positive sampling pulses 145 is provided by the transformer 518 and the single-pole switch 519. The 400 cycle-per-second reference voltage $e_r$ is applied to the primary winding of transformer 518, and the secondary voltage selected by the switch 519 is coupled to the input of servo amplifier 516. The slewing voltage enables the operator to match the loran A and B pulses on the face of the cathode-ray tube. When the A and B pulses have been properly matched on the face of the cathode-ray indicator, the automatic tracking servo system will thereafter maintain the pulses properly matched as the position of the loran receiver-indicator system is moved in space relative to the position of the loran master and slave stations.

While the servomotor 517 is automatically maintaining the positive sampling pulses 146 in coincidence with the differentiated B pulses, the AFC voltage on lead 49 is adjusting the frequency of the precision timing oscillator to maintain the oscillator synchronized with the received A or B pulses. When the frequency of the precision timing oscillator is varied, the pulses 145 and 146 maintain their relative time displacement and move together either to the right or left with respect to the received loran A and B pulses. Accordingly, as the AFC voltage of waveform GG on lead 49 is correcting the frequency of the precision timing oscillator, the loran A and B pulses remain properly matched on the face of the cathode-ray tube indicator.

The AFC voltage on lead 49 varies according to the average value of the error control voltage of waveform FF. The average value of the error control voltage of waveform FF may be either positive, negative, or zero depending upon the magnitude and polarity of the first and second direct voltages W and DD. Although the alternating component of the error control voltage of waveform FF may be zero, indicating proper match between the received A and B pulses, a positive or negative direct voltage may be present at the movable contact of relay 513 indicating that the positive sampling pulses 145 and 146 do not coincide with the cross-over or zero position of the differentiated A and B pulses of waveform V'. Since there is a direct connection from relay 513 through the cathode follower 452 and the low-pass filter to the frequency control circuit of the precision timing oscillator, the positive or negative direct potential at the output of relay 513 will cause the frequency of the precision timing oscillator to vary so that the time position of the positive sampling pulses 145 and 146 will approach the cross-over or zero position of the differentiated A and B pulses. When the time position of the positive sampling pulses 145 exactly coincides with the cross-over or zero position of the differentiated A pulse of waveform V', and the time position of the variably-delayed positive sampling pulses 146 exactly coincides with the cross-over or zero position of the differentiated B pulse, the first direct voltage of waveform W and the second direct voltage of waveform DD are both zero. Similarly, the error control voltage of waveform FF is zero as well as the average value of this error control voltage represented by waveform GG. For this condition, the loran A and B pulses are properly matched on the face of the cathode-ray tube and the precision timing oscillator is properly synchronized with the received loran signals.

Should there be a momentary loss of either the loran A or B pulses, due to fading or to improper transmitter operation, the frequency of the precision timing oscillator will nevertheless be controlled by the everage value of the error control voltage of waveform FF. Accordingly, the precision timing oscillator will be properly synchronized with the remaining loran A or B pulses. If the loran A pulses are momentarily lost resulting in the first direct voltage of waveform W becoming zero, the error control voltage will energize the servomotor 517 and the average value of the error control voltage on lead 49 will vary the frequency of the precision timing oscillator. These two controlling voltages will both act to maintain the positive sampling pulses 146 in coincidence with the cross-over or zero position of the differentiated B pulses, thereby causing the error control voltage to reduce to zero. Upon the reappearance of the loran A pulses, the first direct voltage of waveform W will be restored. The error control voltage of waveform FF will again energize servomotor 517 to reposition the positive sampling pulses 146 while the average value of the error control voltage will correct the frequency of the precision timing oscillator until the loran A and B pulses are properly matched and the precision timing oscillator is properly synchronized, as represented by the error control voltage of waveform FF being reduced to zero.

Upon the momentary olss of the loran B pulses, the frequency of the precision timing oscillator will be controlled by the average value of the error control voltage of waveform FF which varies according to the relative time difference between the positive sampling pulses 145 and the received loran A pulses. Upon the reappearance of the loran B pulses, the error control voltage of waveform FF reappears and again the servomotor 517 is energized and the frequency of the precision timing oscillator is varied until the loran A and B pulses are properly matched and the precision timing oscillator properly synchronized with the received loran signals.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radio navigation receiving system responsive to recurrent A pulses transmitted from a master station and to recurrent B pulses transmitted from a slave station, said receiving system including an electrically controllable precision oscillator means for producing first recurrent output pulses adapted to be synchronized with the received recurrent A pulses and further including means coupled to the output of said precision oscillator means for producing delayed second recurrent output pulses adapted to be synchronized with the received recurrent B pulses; an automatic frequency control system comprising means coupled to the output of said receiving system for differentiating the received recurrent A and B pulses, synchronizer means coupled to the output of said differentiating circuit, means coupling said first recurrent output pulses and said delayed second recurrent output pulses from said receiving system to said synchronizer means, said synchronizer means producing a first direct output voltage varying in magnitude and polarity according to the relative time difference between said first recurrent output pulses and said differentiated A pulses, said synchronizer means further producing a second direct output voltage varying in magnitude and polarity according to the relative time difference between said delayed second recurrent output pulses and said received differentiated B pulses, switching means coupled to the output of said synchronizer means, filter means coupled to said switching means, said switching means coupling said first direct voltage to said filter means during a first time interval and coupling said second direct voltage to said filter means during a second time interval, said filter means producing an output frequency control voltage varying according to the average value of said first and second direct voltages, and means adapted for coupling said frequency control voltage to said electrically controllable precision oscillator means for controlling the frequency thereof.

2. An automatic frequency control system for a hyperbolic navigation receiving system including an oscillator means adapted to be synchronized with received first or second voltage waves, said navigation receiving system including means coupled to said oscillator means for producing a first output voltage and a second output voltage delayed in phase with respect to said first output voltage: comprising in combination, means coupled to the output of said receiving system and responsive to said received first and second voltage waves, said means further responsive to said first output voltage and said second delayed output voltage, said responsive means producing a first direct output voltage varying according to the relative phase displacement between said received first voltage wave and said first output voltage and further producing a second direct output voltage varying according to the relative phase displacement between said received second voltage wave and said delayed second output voltage, switching means coupled to the output of said responsive means, filter means coupled to said switching means, said switching means coupled said first direct output voltage to said filter means during a first time interval and coupling said second direct output voltage to said filter means during a second time interval, said filter means producing an output frequency control voltage varying according to the average value of said first and second direct output voltages, and means adapted for coupling said output frequency control voltage to said oscillator means for controlling the frequency of said oscillator means.

3. The automatic frequency control system as defined in claim 2 further comprising servo amplifier means coupled to the output of said switching means for receiving said first direct output voltage during said first time interval and said second direct output voltage during said second time interval, servomotor means coupled to the output of said servo amplifier, and means adapted for coupling said servomotor to said means coupled to said oscillator means for producing said second delayed output voltage for varying the delay of said second output voltage relative to said first output voltage in accordance with the difference between said first and second direct voltages.

4. The automatic frequency control system as defined in claim 2 further comprising means including a servomotor coupled to said switching means for receiving said first direct output voltage during said first time interval and said second direct output voltage during said second time interval, and means adapted for coupling said servomotor to said means coupled to said oscillator means for producing said second delayed output voltage for varying the delay of said second output voltage relative to said first output voltage in accordance with the difference between said first and second direct voltages.

5. In a radio navigation receiving system responsive to recurrent A pulses transmitted from a master station and to recurrent B pulses transmitted from a slave station, said receiving system including means for producing first recurrent pulses adapted to be synchronized with said received recurrent A pulses and producing delayed second recurrent pulses adapted to be synchronized with said recurrent B pulses, said receiving system further including means responsive to said first and second recurrent pulses and a version of said recurrent A and B pulses for producing a first direct output voltage varying in magnitude and polarity according to the relative time difference between said first recurrent pulses and a version of said received recurrent A pulses and further producing a second direct output voltage varying in magnitude and polarity according to the relative time difference between said second recurrent pulses and a version of said received recurrent B pulses: an automatic frequency control system comprising in combination switching means coupled to the output of said radio navigation receiver for receiving said first and second direct output voltages, filter means coupled to said switching means, said switching means coupling said first output voltage from said navigation receiving system to said filter means during a first time interval and coupling said second direct output voltage from said navigation receiving system to said filter means during a second time interval, said filter means producing an output frequency control voltage varying according to the average value of said first and second direct output voltages, and means adapted for coupling said frequency control voltage to said means producing said first recurrent pulses and said delayed second recurrent pulses for maintaining said first recurrent pulses synchronized with said received recurrent A pulses.

6. The apparatus as defined in claim 5 further comprising means including a servomotor coupled to said switching means for receiving said first and second direct output voltages, and means adapted for coupling said servomotor to said means producing said delayed second recurrent pulses for varying the delay of said second recurrent pulses relative to said first recurrent pulses in accordance with the difference between said first and second direct voltages for maintaining said delayed second recurrent pulses synchronized with said recurrent B pulses.

7. In a radio navigation receiving system responsive to recurrent A pulses transmitted from a master station and to recurrent B pulses transmitted from a slave station, said receiving system including an electrically controllable precision oscillator means for producing first recurrent output pulses adapted to be synchronized with the received recurrent A pulses and further including means coupled to the output of said precision oscillator means for producing delayed second recurrent output pulses adapted to be synchronized with the received recurrent B pulses; an automatic frequency control system comprising means coupled to the output of said receiving system for differentiating the received recurrent A and B pulses, synchronizer means coupled to the output of said differentiating circuit, means coupling said first recurrent output pulses and said delayed second recurrent output pulses from said receiving system to said synchronizer means, said synchronizer means producing a first direct output voltage varying in magnitude and polarity according to the relative time difference between said first recurrent output pulses and said differentiated A pulses, said synchronizer means further producing a second direct output voltage varying in magnitude and polarity according to the relative time difference between said delayed second recurrent output pulses and said received differentiated B pulses, means coupled to the output of said synchronizer means and responsive to said first and second direct output voltages for producing an output frequency control voltage varying according to the average value of said first and second direct output voltages, and means adapted for coupling said frequency control voltage to said electrically controllable precision oscillator means for controlling the frequency thereof.

No references cited.